US012783249B2

(12) United States Patent
Curtin et al.

(10) Patent No.: US 12,783,249 B2
(45) Date of Patent: Nov. 3, 2026

(54) INITIAL SCALABLE FILESYSTEM FOR INITIALIZING OPERATING SYSTEMS

(71) Applicant: Red Hat, Inc., Raleigh, NC (US)

(72) Inventors: Eric Curtin, Dublin (IE); Leigh Griffin, Waterford (IE); Alexander Larsson, Stockholm (SE); Daniel Walsh, Augusta, GA (US)

(73) Assignee: Red Hat, Inc., Raleigh, NC (US)

( * ) Notice: Subject to any disclaimer, the term of this patent is extended or adjusted under 35 U.S.C. 154(b) by 85 days.

(21) Appl. No.: 18/913,835

(22) Filed: Oct. 11, 2024

(65) Prior Publication Data

US 2026/0104896 A1 Apr. 16, 2026

(51) Int. Cl.
*G06F 9/4401* (2018.01)

(52) U.S. Cl.
CPC .................................. *G06F 9/4401* (2013.01)

(58) Field of Classification Search
CPC .... G06F 9/4416; G06F 9/4406; G06F 9/4401; G06F 21/575
USPC .............................................................. 713/2
See application file for complete search history.

(56) References Cited

U.S. PATENT DOCUMENTS 10,558,818 B2 * 2/2020 Goyal ................. G06F 21/6227
11,416,616 B2 * 8/2022 Kliewer ................ H04L 9/3247
11,797,288 B2 * 10/2023 Ren ....................... G06F 16/188
12,423,435 B2 * 9/2025 Griffin .................. G06F 21/575
12,463,662 B2 * 11/2025 Yu ......................... G06F 3/0608
2024/0256289 A1 * 8/2024 Stewart ................. G06F 9/4418
2025/0060971 A1 * 2/2025 Yang ..................... G06F 9/4401
2025/0224977 A1 * 7/2025 Luo ........................... G06F 8/63
2025/0278521 A1 * 9/2025 Zhang ................... G06F 21/602

OTHER PUBLICATIONS

Corresponding EP application No. 24221840.2-1207 Search report mailed Apr. 25, 2025 (9 pages).
Anonymous; Wikipedia—URL:https://web.archive.org/web/20240920212937/https://en.wikipedia.org/wiki/Initial_ramdisk (5 pages) [Retrieved from the Internet Apr. 24, 2025].
Anonymous: "A decision on composefs 1-15 [LWN.net]", G06F Jun. 7, 2023 (Jun. 7, 2023), XP093269423, Retrieved from the Internet: URL:https://lwn.net/Articles/933616 (7 pages) [retrieved on Apr. 24, 2025].

(Continued)

*Primary Examiner* — Brian T Misiura
(74) *Attorney, Agent, or Firm* — Womble Bond Dickinson (US) LLP

(57) ABSTRACT

This disclosure provides devices, systems, methods, and techniques for booting up an operating system with an initial scalable filesystem. An example method includes loading, from a non-transitory and non-volatile memory, a bootloader into a random access memory (RAM). The method includes loading, by the bootloader, a kernel into the RAM. The method includes initializing, by the kernel, an initial filesystem to load storage drivers relevant to the hardware resources for starting essential storage components. The method includes, when the initial filesystem is initialized, mounting, by a processing device, an overlay filesystem onto the initial filesystem of the RAM. The method further includes transitioning, upon completion of system initialization tasks in the overlay filesystem, from the overlay filesystem to a target root filesystem.

20 Claims, 6 Drawing Sheets

(56) References Cited

OTHER PUBLICATIONS

Edge, Jake: "An introduction to EROFS 1-15 [LWN.net]", Jun. 7, 2023 (Jun. 7, 2023), XP093269892, Retrieved from the Internet: URL:https://lwn.net/Articles/934047, (4 pages) [retrieved on Apr. 24, 2025].

* cited by examiner

INITIAL SCALABLE FILESYSTEM FOR INITIALIZING OPERATING SYSTEMS

FIELD

Aspects of the present disclosure relate to starting up operating systems.

BACKGROUND

The startup process of an operating system often begins with the system's firmware (e.g., Basic Input/Output System (BIOS) or Unified Extensible Firmware Interface (UEFI)) initializing hardware components and loading the bootloader from the boot device. The bootloader, such as a grand unified bootloader (GRUB), loads the kernel into memory along with a temporary filesystem (e.g., an initial ramdisk, such as initrd, or initramfs). The kernel then initializes the system hardware, mounts the root filesystem, and starts the initialization process. The kernel sets up the environment for user interaction, such as through a login prompt or a graphic interface. When the initial root filesystem is mounted, many configuration tasks may be required, including device detection, loading various modules, network setup, displaying boot process images (e.g., bootsplash), operating system deployment, verifying root filesystem, decryption, among others.

For automotive computer systems, the startup process of in-vehicle infotainment systems, telematics, and advanced driver-assistance systems (ADAS) may take a prohibitively long period of time to load the temporary filesystem and to perform these configuration tasks, as the number of sensors and devices connected to the automotive computer systems continues to grow.

SUMMARY

According to an example aspect of the present disclosure, a method provides starting up an operating system on hardware resources. The method includes loading, from a non-transitory and non-volatile memory, a bootloader into a random access memory (RAM). The method includes loading, by the bootloader, a kernel into the RAM. The method includes initializing, by the kernel, an initial filesystem to load storage drivers relevant to the hardware resources for starting essential storage components. The method includes, when the initial filesystem is initialized, mounting, by a processing device, an overlay filesystem onto the initial filesystem of the RAM. The method further includes transitioning, upon completion of system initialization tasks in the overlay filesystem, from the overlay filesystem to a target root filesystem.

In some embodiments, initializing the initial filesystem includes performing an up-front decompression for minimal storage only initialization; and initializing, by a device manager of the hardware resources, storage components of the hardware resources based on the up-front decompression, wherein the initializing the storage components comprises loading storage drivers to enable access to the overlay filesystem.

In some cases, the initial filesystem includes a read-only filesystem. The overlay filesystem comprises a loopback-mounted enhanced read-only file system (EROFS) with a transient overlay that is readable and writable.

In some cases, mounting the overlay filesystem includes executing, in the EROFS, on-demand decompression of files for the starting up of the operating system.

In some embodiments, transitioning from the overlay filesystem to the target root filesystem includes: unmounting the overlay filesystem; and mounting the target root filesystem located on a different partition or disk than the overlay filesystem.

In some embodiments, the method further includes initiating a basic input/output system (BIOS) or loading a unified extensible firmware interface (UEFI) before loading the bootloader.

In some embodiments, the bootloader includes a Grand Unified Bootloader (GRUB).

According to another example aspect of the present disclosure, an apparatus is provided for starting up an operating system on hardware resources., the apparatus includes a memory and a processing device coupled to the memory. The processing device and the memory are to load, from a non-transitory and non-volatile memory, a bootloader into a random access memory (RAM). The processing device and the memory are further configured to load, by the bootloader, a kernel into the RAM and initialize, by the kernel, an initial filesystem to load storage drivers relevant to the hardware resources for starting essential storage components. When the initial filesystem is initialized, the processing device and the memory are configured to mount an overlay filesystem onto the initial filesystem of the RAM and transition, upon completion of system initialization tasks in the overlay filesystem, from the overlay filesystem to a target root filesystem.

According to yet another example aspect of the present disclosure, a non-transitory computer-readable storage medium is provided. The computer-readable storage medium includes instructions stored thereon that, when executed by a processing device for starting up an operating system on hardware resources, cause the processing device to load, from a non-transitory and non-volatile memory, a bootloader into a random access memory (RAM); load, by the bootloader, a kernel into the RAM; initialize, by the kernel, an initial filesystem to load storage drivers relevant to the hardware resources for starting essential storage components; when the initial filesystem is initialized, mount an overlay filesystem onto the initial filesystem of the RAM; and transition, upon completion of system initialization tasks in the overlay filesystem, from the overlay filesystem to a target root filesystem.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

Like numerals indicate like elements.

DETAILED DESCRIPTION

Figure 1:
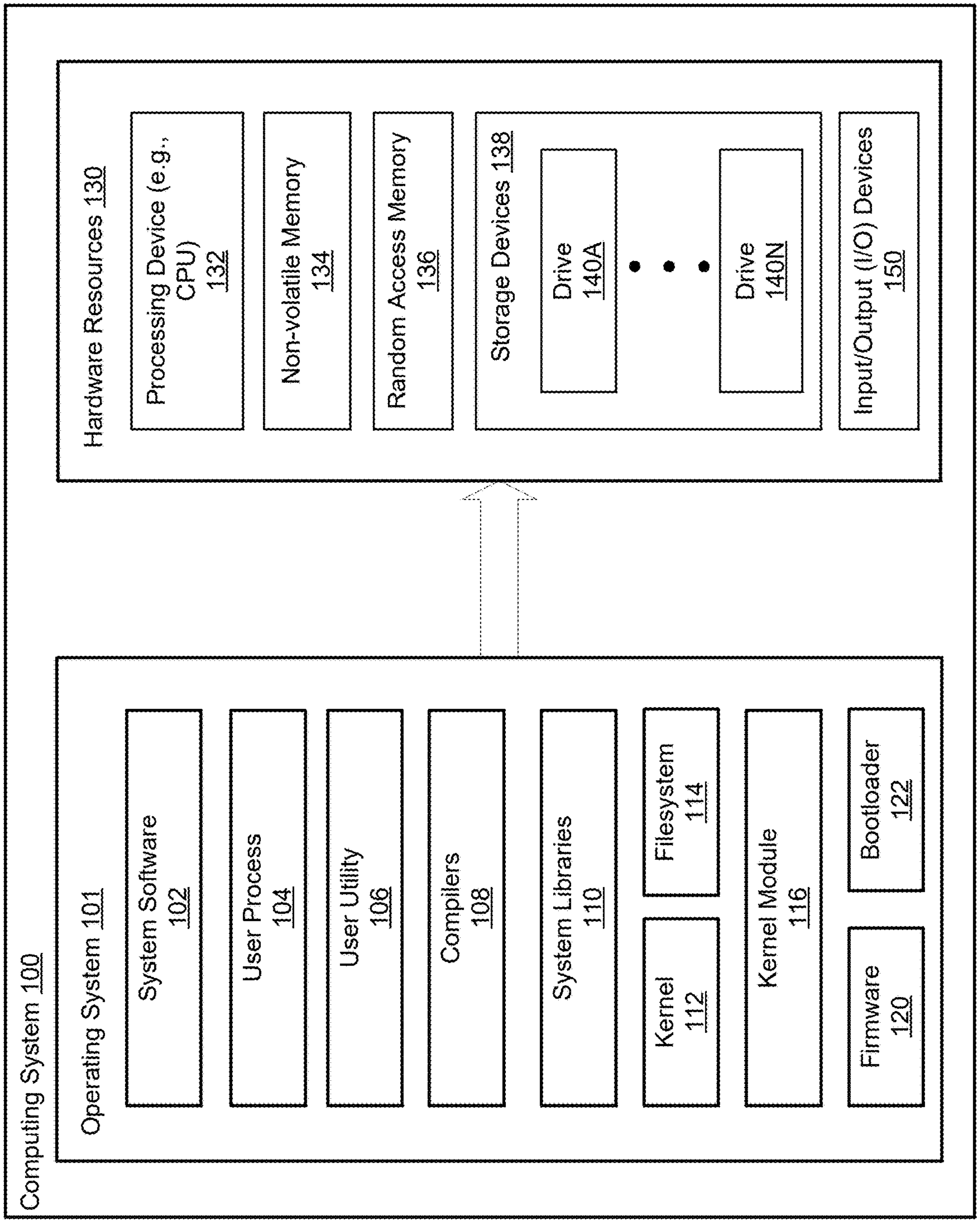
FIG. 1 illustrates an example operating system for a set of hardware resources, in accordance with embodiments of the disclosure.

The present disclosure provides devices, systems, methods, and techniques for initializing (e.g., booting up) an operating system using a scalable filesystem, which maintains a relatively short boot-up time period even when the operating system is for handling an increasing number of hardware devices. During a computer system boot-up, a temporary filesystem is first mounted to run early boot services. The content of the filesystem may be stored as a compressed file on the boot disk partition. Conventional boot-up requires full decompression and read/loaded of the compressed file, even when not all of the compressed file is used. The full decompression and loading often result in a long boot-up time. As the number of hardware devices increases, the boot-up time may further extend. This disclosure introduces novel boot-up stages that create an initial filesystem scalable according to hardware needs while maintaining a minimal boot time.

Existing boot-up filesystems may use an initial random access memory (RAM) disk ("initrd") or an initial RAM filesystem ("initramfs"). The initrd or initramfs is a volatile initial filesystem temporarily mounted on boot to run the early boot services. The content of the filesystem is stored on the boot disk partition, as a compressed file. To create and mount the initrd, the compressed file is fully decompressed and copied to a temporary file system ("tmpfs") in order to start the user-space boot sequence. Because the initrd compressed file supports a large quantity of different hardware, a large proportion of the decompressed and copied information from the compressed file is not used in a specific boot. The initrd may account for different hardware configurations and features. As such, the initrd grows in size over time, as new hardware devices are introduced and backward compatibility is required. The initrd therefore has a large and growing footprint, resulting a growing boot-up time.

Some computer systems have desired limits for the boot-up time. For example, the infotainment system on automobiles may project video feed from the rear camera upon startup. The expected or required boot-up time for the infotainment system can be within five seconds or shorter. The short start-up time becomes even more challenging in view of the increased number of sensors in cars, including additional cameras, lidar, and radar sensors. The present disclosure addresses the above-noted and other problems by providing a boot-up mechanism to create an initial filesystem that is scalable in size, thus maintaining a low boot time even if more hardware devices are connected, without negatively impacting the boot time. The present disclosure further introduces a multi-step process in the boot sequence to handle the transition from the initial file system to the root filesystem.

In some embodiments, the present disclosure provides example methods corresponding to the mechanism for starting up an operating system on hardware resources. One example method includes loading, from a non-transitory and non-volatile memory, a bootloader into a random access memory (RAM). The method includes loading, by the bootloader, a kernel into the RAM. The method includes initializing, by the kernel, an initial filesystem to load storage drivers relevant to the hardware resources for starting essential storage components. The method includes, when the initial filesystem is initialized, mounting, by a processing device, an overlay filesystem onto the initial filesystem of the RAM. The method further includes transitioning, upon completion of system initialization tasks in the overlay filesystem, from the overlay filesystem to a target root filesystem.

Unlike conventional initrd that loads different device drivers and/or firmware for various devices, including storage devices, input devices, graphics, displays, serial ports, consoles, encryption tools, verification tools, compression tools, bootsplash (e.g., boot-up logo display), early camera boot, remote storage mount services, dbus (e.g., desktop-bus) tools, audio tools, coreutils (e.g., core utilities), text editors, debug tools, fonts, release information, etc., the present disclosure provides a minified initial RAM disk and an initial overlay file system that provides a read/writable transient overlay. As such, only storage related devices are initialized and on-demand decompression allows for short bootup time. Embodiments of the present disclosure therefore provide advantages over conventional methods including maintaining a short boot-up time with a scalable filesystem.

FIG. 1 illustrates an example computing system 100, including an operating system 101 for a set of hardware resources 130, in accordance with embodiments of the disclosure. The example computing system 100 may be an automotive embedded system or an in-vehicle computer system, with general computational components as well as specialized computing units designed to control various functions of a vehicle. For example, the example computing system 100 may include an infotainment system, an advanced driver assistance system, a telematics system, an electronic stability control, a dashboard display system, a battery management system, an engine control unit, or a transmission control unit. The example computing system 100 may also be a personal computer, an embedded computer, a server, a gaming console, a workstation, a mainframe computer, a supercomputer, or the like.

As shown in FIG. 1, the example computing system 100 includes hardware resources 130 to be operated by an operating system 101. The operating system 101 may be a personal computer operating system (e.g., one of Linux distributions (e.g., Ubuntu, Debian, etc.), Windows, macOS, Chrome OS, etc.), a mobile operating system (e.g., Android, iOS, etc.), a server operating system, an embedded operating system, a mainframe operating system, a real-time operating system, or a cloud operating system. The hardware resources 130 may include devices for various operations. While some common components are illustrated in FIG. 1, the hardware resources 130 may include additional components not shown in FIG. 1 (e.g., the components shown in FIG. 5).

The operating system 101 may include system software 102, user process 104, user utility 106, compilers 108, system libraries 110, a kernel 112, a filesystem 114, a kernel module 116, a firmware 120, and a bootloader 122.

The system software 102 includes a collection of programs and utilities that manage and control the hardware resources 130, provide a platform for running application software, and offer essential services that allow the system to operate efficiently. Because a common operating system (and the installation drivers therein) may be used for different computers having different hardware resources, the system software 102 may include applicable software pieces that are hardware specific. For example, the system software 102 may include device drivers or programs that allow the operating system 101 to communicate with various hardware devices, translating general input/output instructions into specific instructions for the hardware. The system software 102 may also include system utilities that are programs that perform system-level tasks such as managing files, processes, and system resources, providing users and administrators with the tools to maintain and interact with the system.

The system software 102 may include a shell that is a command-line interpreter that allows users to interact with the operating system by typing commands, executing user commands, running scripts, and controlling the execution of processes. The system software 102 may include system daemons are background processes that run continuously and provide system services like network management or scheduling jobs. The init system, such as systemd, is responsible for booting the system, managing system services, and handling startup and shutdown processes, ensuring that the system is initialized correctly and operates smoothly.

The user process 104 includes a process that may be initiated and run by a user. This differs from processes that are part of the system's core operations. User processes may include applications, scripts, and services that users start, either directly by executing a command or indirectly through system services. These processes run in user space, a restricted environment that prevents direct access to critical system resources, ensuring that they cannot inadvertently or maliciously damage the system. User processes may be created and managed by the user or another user process, with each process being assigned a unique process identifier by the operating system. The user processes interact with the kernel through system calls, which are controlled interfaces provided by the kernel for performing tasks like file operations, memory management, and inter-process communication.

In some cases, the user process 104 may be a foreground process, which interact directly with the user, or background processes, which run independently without direct user interaction. These processes operate with the permissions of the user who started them, and they consume system resources like CPU time, memory, and disk space to perform their tasks. The lifecycle of a user process typically includes creation, execution, and termination, with the possibility of spawning child processes. Tools like nice and renice allow users to influence the scheduling priority of their processes, ensuring that the system allocates resources efficiently.

The user utility 106 may include a command-line tool or application that provides users with the ability to perform specific tasks or manage various aspects of the system. The user utility 106 may be used directly by users, typically through a terminal or command-line interface, and offer a wide range of functionalities that help in managing files, processes, and system settings. The user utility 106 may be used in specific task or set of tasks, such as file manipulation, text processing, system monitoring, or network management. The user utility 106 may come with various command-line options and arguments that allow users to customize the utility behavior. Common examples include ls for listing directory contents, grep for searching text patterns, top for monitoring system processes, and ping for testing network connectivity. The user utility 106 may allow users to navigate the filesystem, manage files and directories, modify system settings, process text, monitor system performance, and manage network connections, among other tasks.

The compilers 108 may translate source code written in high-level programming languages, such as C, C++, or Fortran, into machine code or executable binaries that the system's processor can understand and execute. This process of compilation may allow human-readable code to be transformed into a form that the computer's hardware can directly process. The compilation involves several stages, including parsing the source code, optimizing it for performance, and generating the final machine code. One of the essential functions of a compiler is to optimize the code during this translation process, improving the efficiency and speed of the final executable while minimizing resource usage.

The compilers 108 may also perform error checking, such as analyzing the source code for syntax and semantic errors, helping developers identify and correct mistakes before the program is run. This pre-execution check is vital for ensuring that the resulting software is reliable and less prone to bugs. After compiling the individual source files, the compiler usually invokes a linker, which combines these compiled object files into a single executable program. The linker resolves references to functions and variables across different files and links any necessary libraries, resulting in an executable binary file that the processor can execute.

The compilers 108 may include GCC (GNU Compiler Collection), which supports multiple programming languages like C, C++, and Fortran, and Clang, part of the LLVM project, known for its fast compilation times and excellent diagnostics. Other examples include Javac, the Java compiler that transforms Java source code into bytecode for the Java Virtual Machine (JVM), and the Rust compiler (rustc), which is gaining popularity for its focus on memory safety and performance. The compiler 108 may enable the creation of efficient, executable programs from high-level source code.

The system libraries 110 may include collections of pre-compiled routines that programs can use to perform common tasks, such as handling input/output operations, managing memory, and interacting with the system's hardware. The libraries 110 may provide a standardized way for software applications to access system functions without requiring developers to write code for these tasks from scratch. By offering reusable code, system libraries make software development more efficient and help ensure that applications behave consistently across different environments. The system libraries 110 may include GNU C Library (glibc), which provides the core set of APIs for the C programming language, enabling programs to perform essential functions like file manipulation, process control, and error handling. These functions may provide the basic building blocks for interacting with the operating system. Other system libraries may provide other functions, such as graphics rendering, cryptographic operations, or network communication. The system libraries 110 may be stored in shared object files, which means that multiple programs can use the same library simultaneously without each one needing its own copy. This may save memory and simplify updates, as a single library file can be updated, and all programs that depend on it will automatically use the new version. The use of system libraries 110 may also help with compatibility and stability.

The kernel 112 may manage the system's resources and act as a bridge between hardware and software. The kernel 112 is a fundamental layer of the operating system that controls everything from memory management and process scheduling to device communication and system security. The kernel 112 operates in the background, handling low-level tasks and enable the functioning of the computer system. The kernel 112 may manage the memory. The kernel 112 allocates and deallocates memory as needed by different processes, ensuring that each application has the memory it requires while preventing conflicts between processes. The kernel 112 also manages CPU scheduling, determining which processes get CPU time and for how long. This scheduling is essential for maintaining system responsiveness and ensuring that all processes can run efficiently.

The kernel 112 may handle system calls, which are requests from application software for the kernel to perform specific tasks, such as reading from a file or sending data over a network. These system calls provide a controlled interface through which applications can interact with the hardware, allowing the kernel to maintain system stability and security by regulating access to critical resources. Device management may include managing device drivers, which are specialized programs that enable the operating system to communicate with hardware devices like printers, hard drives, and network cards. The kernel loads and interacts with these drivers to ensure that hardware devices operate correctly and efficiently within the system.

The kernel 112 may enforce access controls and ensure that users and applications only have access to the resources they are permitted to use. This security management helps protect the system from unauthorized access and potential threats. In some cases, the Linux kernel is monolithic, meaning the kernel 112 may include all the essential functions within a single large binary, which can be extended with loadable kernel modules 116. These modules 116 can be loaded and unloaded dynamically, allowing the kernel to adapt to different hardware and software configurations without needing to reboot the system.

The filesystem 114 may include a data structure that the operating system 101 uses to manage and organize files and directories on storage devices 138 (such as hard drives, SSDs, USB drives, or any other form of persistent storage). The filesystem 114 may determine how data is stored, accessed, and managed on a disk, providing a logical way to organize and retrieve data efficiently.

The filesystem 114 may be responsible for maintaining the hierarchy of files and directories, for both users and applications to navigate and manage data. This hierarchy starts at the root directory, denoted by "/," and extends into various subdirectories and files. Each file and directory within this structure is assigned a unique name and path, allowing for easy access and organization of data. The filesystem 114 may manage space on the storage device. The filesystem 114 keeps track of which parts of the disk are in use, which are free, and where each file's data is physically stored on the disk. This management involves organizing files into blocks, which are units of storage that the filesystem can easily manage and access. Efficient space management is critical for performance, as it affects how quickly data can be read from or written to the disk.

Different filesystems offer various features and optimizations depending on their intended use case. For example, ext4 (Fourth Extended Filesystem) is widely used in Linux systems due to its balance of performance, reliability, and ease of use. The filesystem 114 may support large files and volumes, journaling (which helps recover from crashes), and handle different types of workloads effectively. Other filesystems like XFS are optimized for handling large files and high-performance I/O operations, making them suitable for environments with heavy data workloads, such as databases and large-scale storage systems. Btrfs (B-Tree Filesystem) introduces advanced features like snapshots, subvolumes, and built-in RAID, which are beneficial for data redundancy and recovery.

The filesystem 114 may manage file permissions and security. In a Linux operating system, for example, each file and directory has associated permissions that determine who can read, write, or execute the file. These permissions are enforced by the filesystem, which interacts with the kernel to ensure that access control policies are maintained. In addition to filesystems that manage data on physical disks, Linux also supports virtual filesystems, such as procfs and sysfs, which provide access to system information and kernel data structures. These virtual filesystems do not represent data on disk but instead offer a way to interact with system and kernel information in a filesystem-like manner.

The kernel module(s) 116 may enable the kernel to be extended dynamically without requiring a system reboot. The kernel modules 116 may be pieces of code that can be loaded into or unloaded from the kernel at runtime, allowing the kernel to adapt to new hardware or features as needed. This modularity may support a wide range of hardware devices, filesystems, and networking protocols that may not be part of the core kernel. For example, when new hardware is connected, the corresponding driver module can be loaded into the kernel to ensure proper functionality.

The kernel module 116 may manage hardware support, such as drivers for network cards, USB devices, or graphics cards. Additionally, the kernel modules 116 allow the kernel 112 to add support for new filesystems or network protocols dynamically. This modular approach keeps the kernel lightweight and efficient, as only the necessary modules are loaded into memory at any given time, conserving system resources and improving overall performance of the computer system 100. The ability to load and unload modules without restarting the computer system 100 is convenient for users and for system administrators and developers. This functionality facilitates easier maintenance, as updates or bug fixes can be applied by simply replacing the relevant module. The modular design also supports testing and development, enabling new features or drivers to be tested in isolation without affecting the stability of the computer system 100.

The firmware 120 may include software embedded directly into hardware components, such as motherboards, network cards, storage devices, or embedded systems, and is stored in the non-volatile memory 134 like ROM, EEPROM, or flash memory. The firmware 120 provides low-level control for specific hardware, acting as a bridge between the hardware and the higher-level software, ensuring that hardware components function correctly and interact with the operating system and other software applications.

For example, in a Linux system, firmware participate in the initialization and operation of various hardware devices. Upon powering on a device, firmware is one of the first pieces of software to run, performing initial checks, configuring hardware settings, and preparing the system to load the operating system. For instance, BIOS or UEFI firmware on a computer's motherboard is responsible for initializing hardware components, performing POST (Power-On Self-Test), and then handing control over to the bootloader, which loads the operating system. Firmware is not limited to motherboards; many other hardware components rely on firmware to function properly. Network cards, GPUs, SSDs, and peripheral devices like printers or keyboards often have firmware governing how these devices operate and communicate with the system. In some cases, firmware updates may be provided by hardware manufacturers to improve performance, add new features, or fix bugs. These updates may ensure compatibility with new operating systems or hardware.

Managing firmware may involve ensuring that the appropriate firmware files are available for the kernel to load when initializing hardware devices. These firmware files are often packaged and distributed and are stored in directories such as /lib/firmware. The kernel loads the necessary firmware into the device during the boot process or when the device is first accessed, allowing it to operate correctly within the system. Firmware is critical for device operation, but it also presents challenges. Because firmware operates at a very low level, any bugs or vulnerabilities can have significant implications for system stability and security. Therefore, it is important to use firmware from trusted sources and to apply firmware updates cautiously, ensuring they come from reputable manufacturers.

The bootloader 122 may load the operating system's kernel into memory and initiate the boot process. The bootloader may be the software that runs after the system firmware (BIOS or UEFI) completes initial hardware checks and configurations. One primary function of the bootloader 122 is to locate the operating system on the system's storage device, load the kernel into memory, and transfer control to the kernel, allowing the operating system to begin initialization. In many systems, the bootloader also provides a menu that allows users to select from multiple operating systems or kernel configurations. This feature is particularly useful in systems with dual-boot or multi-boot setups, where more than one operating system is installed.

The bootloader 122 may be highly configurable and support a variety of filesystems and operating systems. For example, GRUB (GRand Unified Bootloader) is one of the most widely used bootloaders in Linux systems. GRUB can handle multiple operating systems, offer advanced features like password protection for boot options, and support complex configurations involving multiple disks and partitions. For example, in a Linux setup, the bootloader is installed in the Master Boot Record (MBR) or the GUID Partition Table (GPT) of the storage device. When the system is powered on, the firmware loads the bootloader from this location into memory, where the bootloader begins the process of loading the operating system. The bootloader then reads its configuration file, which specifies the location of the kernel and any additional parameters or options needed to boot the system.

Once the kernel is loaded into the memory (e.g., the RAM 136), the bootloader 122 passes control to the kernel 112 and exits from the memory. At this point, the kernel 112 takes over, initializing the rest of the operating system and hardware, eventually presenting the user with a login prompt or graphical interface. While the primary role of a bootloader is to load the operating system, the bootloader 122 also provides important recovery and diagnostic functions. If the system encounters issues during boot, the bootloader may offer options to boot into recovery modes, run diagnostic tools, or load a different kernel version. The bootloader may thus maintain system stability and resolve boot-related problems.

The hardware resources 130 includes a processing device 132, a non-volatile memory 134, a random access memory (RAM) 136, one or more storage devices 138, and one or more input or output devices 150 (and other components not shown).

The processing device 132 may include a central processing unit (CPU), which is responsible for executing instructions and performing calculations. Often regarded as the "brain" of the computer, the CPU handles most operations that enable the computer to function. Within the CPU, several key components work together to process data efficiently and accurately. For example, the Arithmetic Logic Unit (ALU) performs arithmetic and logical operations, carrying out the actual computations needed by the system. The Control Unit (CU) interprets instructions from programs, orchestrating the actions of the ALU, registers, and other components by converting these instructions into signals that direct the CPU's operations. Registers provide temporary storage for data and instructions, holding critical information that is used during processing. Cache memory is a small, high-speed memory located close to or within the CPU, storing frequently accessed data to speed up processing and improve performance by reducing the time needed to retrieve information.

The CPU clock generates a steady stream of pulses to synchronize the activities of the processor's components, with the clock speed determining how many instructions can be processed per second. In some embodiments, multiple cores allow for parallel processing, where each core can execute its own set of instructions simultaneously, enhancing performance, particularly in multi-threaded applications. The bus interface connects the CPU to other components within the computer, facilitating the transfer of data between the CPU, memory, input/output devices, and storage, ensuring smooth communication throughout the system.

The CPU is responsible for fetching instructions from memory, decoding and executing them, performing calculations and logical operations, and managing the flow of data within the computer. With the capability to handle multiple tasks simultaneously through parallel processing, the CPU significantly improves system efficiency, enabling complex applications to run effectively. The CPU's critical role in executing instructions and managing data flow makes it the foundation of computing.

The non-volatile memory 134 may retain stored data even when the power is turned off. Unlike volatile memory, such as RAM, which loses its contents when the system is powered down, non-volatile memory preserves information, making it essential for long-term data storage in computers and other electronic devices. The non-volatile memory 134 may be used in various applications, including storing the system firmware (such as BIOS or UEFI), holding the operating system, storing user data, and maintaining configuration settings. Because it retains data without needing a constant power supply, non-volatile memory is ideal for use in devices where persistent storage is critical, such as in hard drives, solid-state drives (SSDs), USB flash drives, and memory cards.

Flash memory is one type of non-volatile memory. Flash memory is often found in SSDs, USB drives, and memory cards, offering a good balance between speed, durability, and storage capacity. Another type of non-volatile memory is Read-Only Memory (ROM), which is often used to store firmware that rarely changes. EEPROM (Electrically Erasable Programmable Read-Only Memory) is another form of non-volatile memory that can be erased and reprogrammed electrically, allowing for more flexibility than ROM.

Magnetic storage devices, such as hard disk drives (HDDs), also fall under the category of non-volatile memory. HDDs store data on magnetic platters and retain this data even when the system is powered off. Similarly, optical storage media, like CDs, DVDs, and Blu-ray discs, use non-volatile memory to store data that remains intact without power. Non-volatile memory may maintain the integrity and availability of data across power cycles. The non-volatile may preserve data without continuous power is what makes non-volatile memory a cornerstone of computing systems, ensuring that information is reliably stored and accessible whenever needed.

The RAM 136 may store data that are actively being used or processed by the CPU. Unlike non-volatile memory, such as hard drives or SSDs, RAM requires a constant power supply to retain its data. When the power is turned off, any information stored in RAM is lost. This characteristic makes RAM ideal for temporary storage that supports active processes and tasks. When a program or application is opened, the data and instructions required for that program are loaded from the slower storage devices (like a hard drive or SSD) into RAM. The CPU can then quickly access and manipulate this data in RAM, allowing the system to perform tasks efficiently. The more RAM a system has, the more data it can handle at once, leading to smoother multitasking and faster performance, especially when running memory-intensive applications like video editing software, games, or large databases.

There are different types of RAM, with DRAM (Dynamic RAM) being the most common in computers. DRAM stores each bit of data in a separate capacitor within an integrated circuit and needs to be refreshed thousands of times per second to maintain its data, hence the term "dynamic." Another type of RAM is SRAM (Static RAM), which is faster and more expensive than DRAM. SRAM does not need to be refreshed as frequently as DRAM because it uses a different design that allows it to maintain data as long as power is supplied. RAM is typically installed in the form of modules, such as DIMMs (Dual In-Line Memory Modules), which are inserted into the motherboard's memory slots. These modules come in various capacities and speeds, and upgrading RAM is one of the most common ways to improve a computer's performance.

The storage devices 138 may retain data even when the system is powered off, ensuring that information is preserved and accessible when needed. These devices come in various forms, offering a wide range of capacities and functions, from internal components like hard disk drives (HDDs) and solid-state drives (SSDs) to external options like USB flash drives and optical discs. The storage device 138 may include multiple drives 140A-140N. The drives 140A-140N may store, retrieve, and manage digital data in various computing environments. These drives come in multiple forms as described above, depending on use cases. For example, hard disk drives (HDDs) are storage devices that use spinning magnetic platters to store data. Data is read and written by a mechanical arm with read/write heads that move across the platters. HDDs are known for offering large storage capacities at relatively low costs, making them suitable for storing vast amounts of data, including operating systems, applications, and personal files. However, due to their mechanical nature, HDDs are generally slower and more prone to physical wear compared to solid-state drives.

The drives 140A-140N may include solid-state drives (SSDs), which are storage devices that use flash memory to store data. Unlike HDDs, SSDs have no moving parts, which makes them faster, more durable, and less susceptible to physical damage. SSDs provide significantly faster data access speeds, resulting in quicker boot times, faster application loading, and improved overall system performance. While SSDs are more expensive per gigabyte than HDDs, their speed and reliability make them increasingly popular, especially in high-performance computers, laptops, and portable devices. Hybrid drives, or Solid-State Hybrid Drives (SSHDs), combine the large storage capacity of HDDs with the speed of SSDs. SSHDs use a small amount of flash memory to store frequently accessed data, while the rest of the data is stored on spinning platters. This combination allows for faster access to commonly used files and programs while maintaining the higher storage capacity and lower cost of an HDD. SSHDs offer a balanced solution for users seeking both speed and storage space.

The drives 140A-140N may include optical drives, such as compact disk (CD), digital video disk (DVD), and Blu-ray drives, which use lasers to read and write data on optical discs. USB flash drives are portable storage devices that use flash memory and connect to computers via USB ports. USB flash drives vary in capacity, from a few gigabytes to several terabytes, and are widely used for quick and convenient data storage and transfer.

The drives 140A-140N may include external hard drives, which are standalone storage devices that connect to a computer via USB, Thunderbolt, or other interfaces. They can be either HDDs or SSDs enclosed in a portable case, providing additional storage space for backups, large files, and media libraries. External hard drives are commonly used for data backup, file sharing, and expanding the storage capacity of laptops and desktops without the need for internal upgrades. Network Attached Storage (NAS) drives are dedicated storage devices connected to a network, allowing multiple users and devices to access and share data over the network. NAS drives are often used in home and business environments for centralized data storage, backups, and media streaming. They provide a convenient way to manage large volumes of data while offering features like remote access, data redundancy, and automated backups.

The drives 140A-140N may include virtual drives, which are software-based storage solutions that emulate physical drives within a computer's operating system. A virtual drive creates a file or a set of files that the system treats as if it were a physical disk, allowing users to mount and access disk images, such as ISO files, without the need for physical media. Virtual drives are commonly used for software installation, testing, and emulating additional storage devices without requiring actual hardware. Virtual drives are also used in cloud storage environments, where virtualized storage resources are allocated to users or applications over a network, providing scalable and flexible storage solutions.

The drives 140A-140N may include cloud storage drives, which are a form of virtual drive where data is stored on remote servers accessed via the internet. Services like Google Drive, Dropbox, and OneDrive allow users to store files online and access them from any device with an internet connection. Cloud storage drives provide the convenience of accessing data from anywhere, along with features like automatic backups, file sharing, and collaboration.

The I/O devices 150 may include various devices that enable interaction between a computer system and the external environment. These devices facilitate the exchange of data between the computer and external entities, allowing for input (data sent to the computer) and output (data sent from the computer). I/O devices may perform tasks such as receiving user inputs, displaying information, communicating with other devices, and controlling various hardware functions. As the interface between the computer's central processing unit (CPU) and the external world, I/O devices are integral to the functioning of any computing system.

The I/O devices 150 may include input devices, such as keyboards, mice, scanners, and microphones, which allow data to be entered into the computer for processing. Output devices, including monitors, printers, speakers, and projectors, take processed data from the computer and present it to the user or another system. Some devices function as both input and output devices, such as touchscreens, external storage devices, and network interface cards (NICs), enabling bidirectional data exchange.

The I/O devices 150 may enable communication between the computer system and the external environment. Input devices allow the entry of data, commands, and control signals, which the CPU processes to perform tasks. Output devices provide a means for the computer to convey information to the user through visual, auditory, or printed forms. Devices that serve both input and output functions offer versatile interaction with the computer, supporting complex tasks like data transfer, storage, and real-time control.

The I/O devices 150 may be specialized applications in fields such as industrial control, medical devices, and scientific instruments, where precise and reliable data exchange is essential. Furthermore, I/O devices are vital for accessibility, enabling users with disabilities to interact with computers through assistive technologies like braille displays, voice recognition systems, and alternative input methods. As essential components of a computer system, I/O devices enable interaction and communication, making them indispensable for a wide range of computing tasks and applications.

Figure 2:
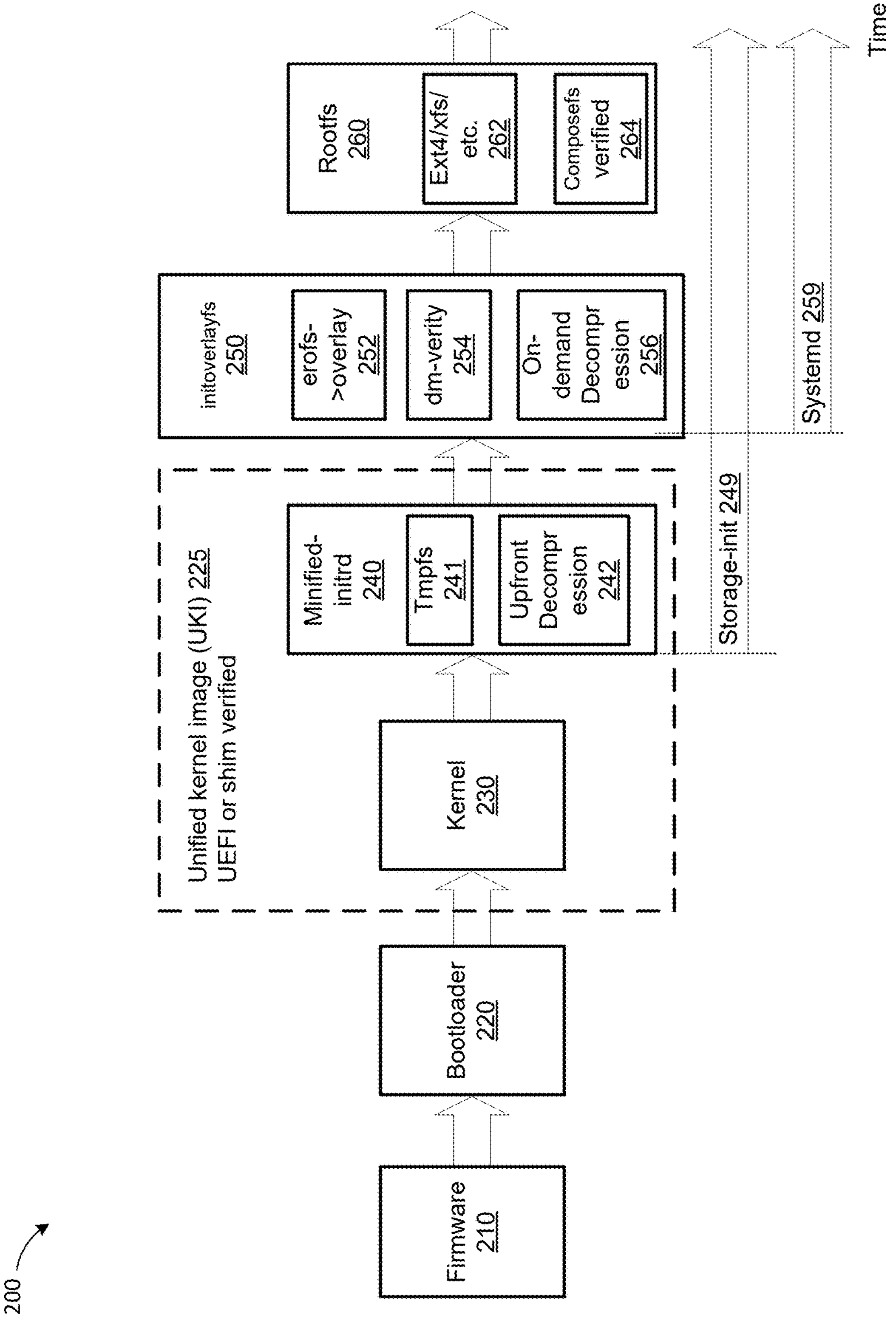
FIG. 2 illustrates an example boot-up procedure for the example operating system shown in FIG. 1, in accordance with embodiments of the disclosure.

FIG. 2 illustrates an example boot-up procedure 200 for the example operating system 101 shown in FIG. 1, in accordance with embodiments of the disclosure. As shown, a processing device, such as the processing device 132 of FIG. 1, starts the boot-up procedure 200 by first loading the firmware 210 and the bootloader 220, the processes of which are similar to conventional boot-up procedures. Contrasting the conventional boot-up procedures, the present disclosure introduces a minified initial RAM disk ("minified-initrd") 240 and the initial overlay filesystem ("initoverlayfs") 250 at respective stages, which include the storage initialization (storage-init) stage 249 and the system and service manager ("systemd") stage 259. The stages 249 and 259 enable a scalable boot-up mechanism that handles changing hardware resources without negatively impacting the boot-up speed.

As shown in FIG. 2, once the bootloader 220 is loaded, the processing device may initiate the unified kernel image (UKI) 225 and verify the unified extensible firmware interface (UEFI) or shim (a first-stage UEFI bootloader). When the kernel 230 is started, the kernel 230 loads the minified initial RAM disk 240, in a temporary filesystem ("Tmpfs") 241. The minified initial RAM disk 240 performs upfront decompression 242. For example, the upfront decompression 242 is focused on a minimal list of drivers for the storage initialization stage 249. Unlike conventional upfront decompression for a complete RAM disk, the minified initial RAM disk 240 decompresses data or files necessary for loading the initial overlay filesystem 250 in the stage 259 only, thus saving substantial time for computation and loading.

After loading the minified initialization RAM disk 240, the processing device loads the initial overlay filesystem 250. Once the initial overlay filesystem 250 is loaded, the initial overlay filesystem 250 enables on-demand compression 256. As shown in FIG. 2, the present disclosure introduces the initial overlay filesystem 250 into the multiple stages 249 and 259 during the bootup of the operating system, such as the operating system 101 of FIG. 1. At a high level, the initial overlay filesystem 250 is a read-only file system with the contents of the non-minified, pre-existing initial RAM disk. The kernel 230 (similar to the kernel 112) then mounts the initial overlay filesystem 250.

The processing device 132 uses a read/writable transient overlay 252 (referred to herein as erofs→overlay 252) on top of the initial overlay filesystem 250 to make the initial overlay filesystem 250 volatile. By comparison, the transient overlay 252 of the initial overlay filesystem 250 and the transient overlay 252 allow the bootup process to boot faster and more scalable than the conventional initial RAM disk, when the operating system is facing hardware resources with increasing sizes. The scalable initialization using the transient overlay 252 enables fast bootup for more complicated tools and machines (e.g., of different hardware resources) than in existing bootup methods. The processing device 132 may then run a device-mapper's verity "dm-verity" 254, which provides transparent integrity checking of block devices using a cryptographic digest provided by the kernel crypto API. The device-mapper's verity target is often read-only. The processing device 132 may perform on-demand decompression 256 after the integrity checking.

As discussed herein, the scalable initialization or boot-up procedure 200 starts first with the BIOS or UEFI firmware loading (e.g., the processing device loading the firmware 120 from the non-volatile memory 134 of FIG. 1). The bootloader 220 (e.g., GRUB) is then loaded (e.g., similar to loading the bootloader 122). The bootloader 220 then loads the kernel 230 (e.g., vmlinuz) into the RAM (e.g., the RAM 136). Compared to conventional boot-up procedures, this disclosure introduces the storage initialization stage 249. The storage initialization stage 249 is followed by starting a device manager (e.g., udev or an equivalent) in the system and service manager stage 259. The kernel 230, the storage initialization, and the device manager may collectively participate in initializing essential storage components (e.g., within the UKI 225). For example, the storage initialization stage (storage-init) 249 includes a utility or script to initialize and configure storage devices during the system's boot process. The storage initialization may be responsible for setting up filesystems, mounting storage devices, and preparing the storage environment for the operating system to use.

The device manager (not separately shown) is responsible for managing device nodes in a directory dynamically. The device manager may handle the detection of hardware and manage the corresponding device files, which represent hardware components. UDEV may run as a daemon and listens to kernel events (e.g., adding or removing devices), creating or removing device nodes in response. The device manager also manages device permissions and may execute specific actions when devices are connected.

This disclosure introduces "minified-initrd" of the minified initial RAM disk 240 as a small and lightweight initial RAM filesystem to load only storage drivers relevant to the hardware. The minified initial RAM disk 240 may primarily enable access to the overlay filesystem. For example, when the device manager has initialized storage devices, the minified initial RAM disk 240 may be switched to the more feature-rich overlay filesystem 250. For example, the processing device uses the minified initial RAM disk 240 to mount the initial overlay filesystem 250. The initial overlay filesystem 250 may be a loopback-mounted enhanced read-only file system (EROFS) with a transient overlay. The EROFS has support for on-demand decompression (e.g., via lz4hc). This is unlike the conventional initial RAM disk (initrd), which decompresses the whole filesystem upfront (and thus making the new approach more flexible and scalable).

Once the minified initial RAM disk 240 has been mounted, the processing device transitions the operating system boot-up to the initial overlay filesystem 250. The initial overlay filesystem 250 replaces the (conventional) storage initialization process with a complete initialization process. The initial overlay filesystem 250 may include additional tools, modules, and scripts needed for system configuration, such as to perform tasks typically handled by a full initial RAM disk. For example, configuration tasks may include device detection, loading additional modules, network setup, bootsplash, ostree initialization, final root filesystem verity checking, decryption, and other activities necessary for preparing for the transition to the final root file system 260.

The initial overlay filesystem 250 performs necessary system initialization tasks, such as initializing hardware and loading drivers. The initial overlay filesystem 250 mounts the real root filesystem 260 when the initialization is complete. For example, the processing device transitions the operating system to the final root system 260, such as the fourth extended filesystem (Ext4) or the xfs filesystem 262. For example, the system may use pivot root or switch root to replace the temporary root filesystem with the final root filesystem. The final root filesystem may include a verified composefs 264 (a Linux filesystem module, for example). The transition may include unmounting the initial overlay filesystem 250 and mounting the real root file system 260, which may be located on a different partition or disk.

Figure 3:
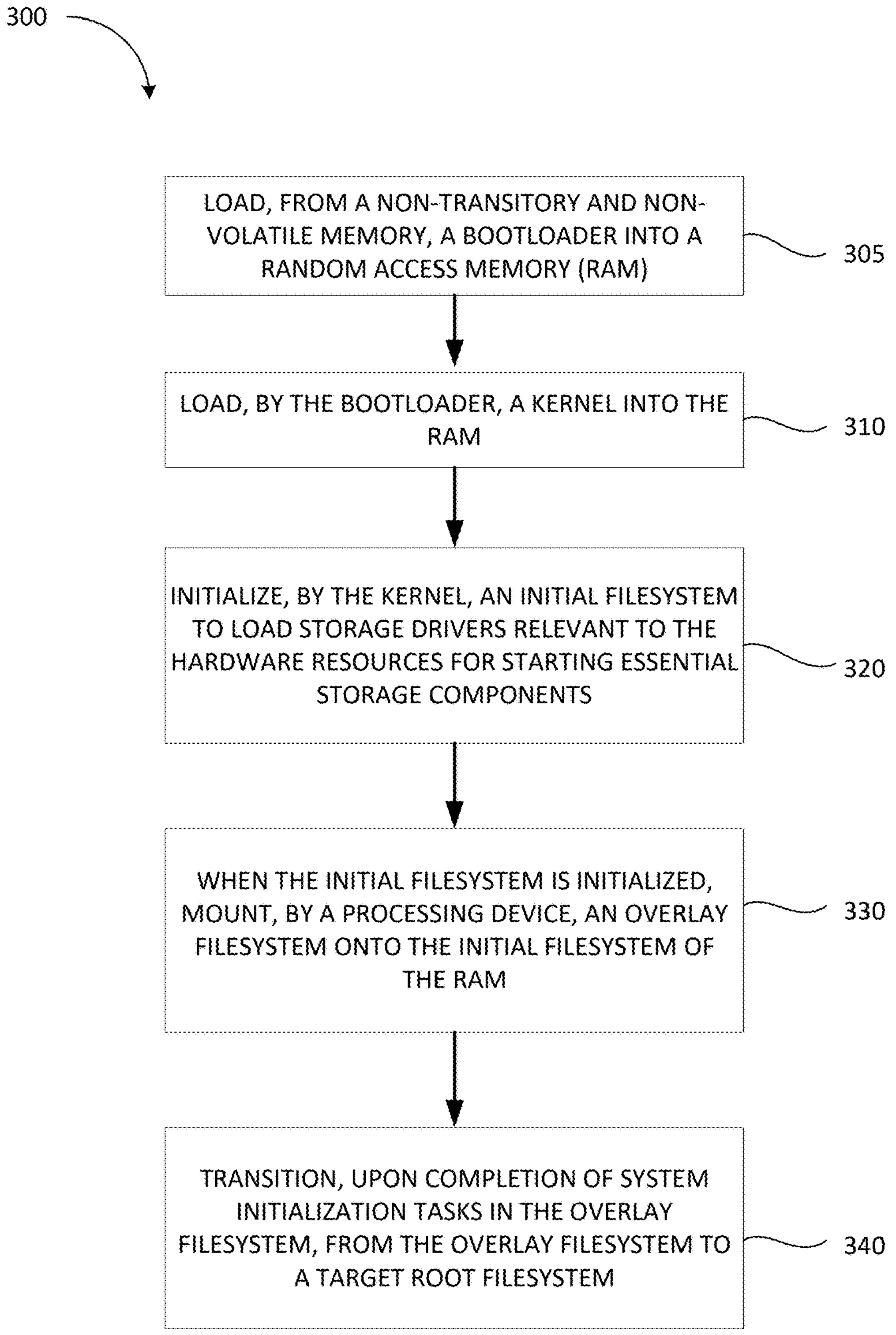
FIG. 3 is a flow diagram of method for initializing a scalable filesystem for the example operating system shown in FIG. 1, in accordance with embodiments of the disclosure.

FIG. 3 is a flow diagram of method 300 for initializing a scalable filesystem for the example operating system 101 shown in FIG. 1, in accordance with embodiments of the disclosure. As shown, the method 300 starts by loading 305, from a non-transitory and non-volatile memory, a bootloader into a random access memory (RAM). For example, after the BIOS or UEFI firmware has been loaded (e.g., the processing device loading the firmware 120 from the non-volatile memory 134 of FIG. 1), a bootloader (such as the bootloader 220) is then loaded into the memory (e.g., the RAM 136).

The method 300 includes loading 310, by the bootloader, a kernel into the RAM. For example, the kernel may be the kernel 112 of FIG. 1 or the kernel 230 of FIG. 2. The RAM may be the RAM 136 of FIG. 1. The kernel may manage the system's resources and act as a bridge between hardware and software. The kernel may perform memory management and process scheduling to device communication and system security. The kernel may operate in the background, handling low-level tasks to enable the functioning of the computer system. The kernel allocates and deallocates memory as needed by different processes, ensuring that each application has the memory it requires while preventing conflicts between processes.

The method 300 includes initializing 320, by the kernel, an initial filesystem (e.g., the minified-initrd 240 of FIG. 2) to load storage drivers relevant to the hardware resources for starting essential storage components. For example, the initial filesystem includes a minified initial RAM disk that performs upfront decompression, which is focused on a minimal list of drivers for the storage initialization stage. The minified initial RAM disk may decompress data or files necessary for loading an initial overlay filesystem. The essential storage components may include at least one of the drives 140A-N of FIG. 1.

The method 300 includes, when the initial filesystem is initialized, mounting 330, by a processing device, an overlay filesystem onto the initial filesystem of the RAM. For example, the processing device may be the processing device 132 of FIG. 1. The overlay filesystem may be the initial overlay filesystem 250 of FIG. 2. The initial overlay filesystem may include additional tools, modules, and scripts needed for system configuration, such as to perform tasks typically handled by a full initial RAM disk. For example, configuration tasks may include device detection, loading additional modules, network setup, bootsplash, ostree initialization, final root filesystem verity checking, decryption, and other activities necessary for preparing for the transition to a final root file system.

The method 300 further includes transitioning 340, upon completion of system initialization tasks in the overlay filesystem, from the overlay filesystem to a target root filesystem. For example, the target root filesystem may be the root filesystem 260 of FIG. 2. As aforementioned, the processing device transitions the operating system to the final root system, such as the fourth extended filesystem (Ext4) or the xfs filesystem 262, when the initialization is complete. For example, the system may use pivot root or switch root to replace the temporary root filesystem with the final root filesystem. The final root filesystem may include a verified composefs. The transition may include unmounting the initial overlay filesystem and mounting the real root file system that may be located on a different partition or disk.

In some embodiments, initializing the initial filesystem includes performing an up-front decompression for minimal storage only initialization; and initializing, by a device manager of the hardware resources, storage components of the hardware resources based on the up-front decompression, wherein the initializing the storage components comprises loading storage drivers to enable access to the overlay filesystem.

In some cases, the initial filesystem includes a read-only filesystem. The overlay filesystem comprises a loopback-mounted enhanced read-only file system (EROFS) with a transient overlay that is readable and writable.

In some cases, mounting the overlay filesystem includes executing, in the EROFS, on-demand decompression of files for the starting up of the operating system.

In some embodiments, transitioning from the overlay filesystem to the target root filesystem includes: unmounting the overlay filesystem; and mounting the target root filesystem located on a different partition or disk than the overlay filesystem.

In some embodiments, the method further includes initiating a basic input/output system (BIOS) or loading a unified extensible firmware interface (UEFI) before loading the bootloader.

In some embodiments, the bootloader includes a Grand Unified Bootloader (GRUB).

Figure 4:
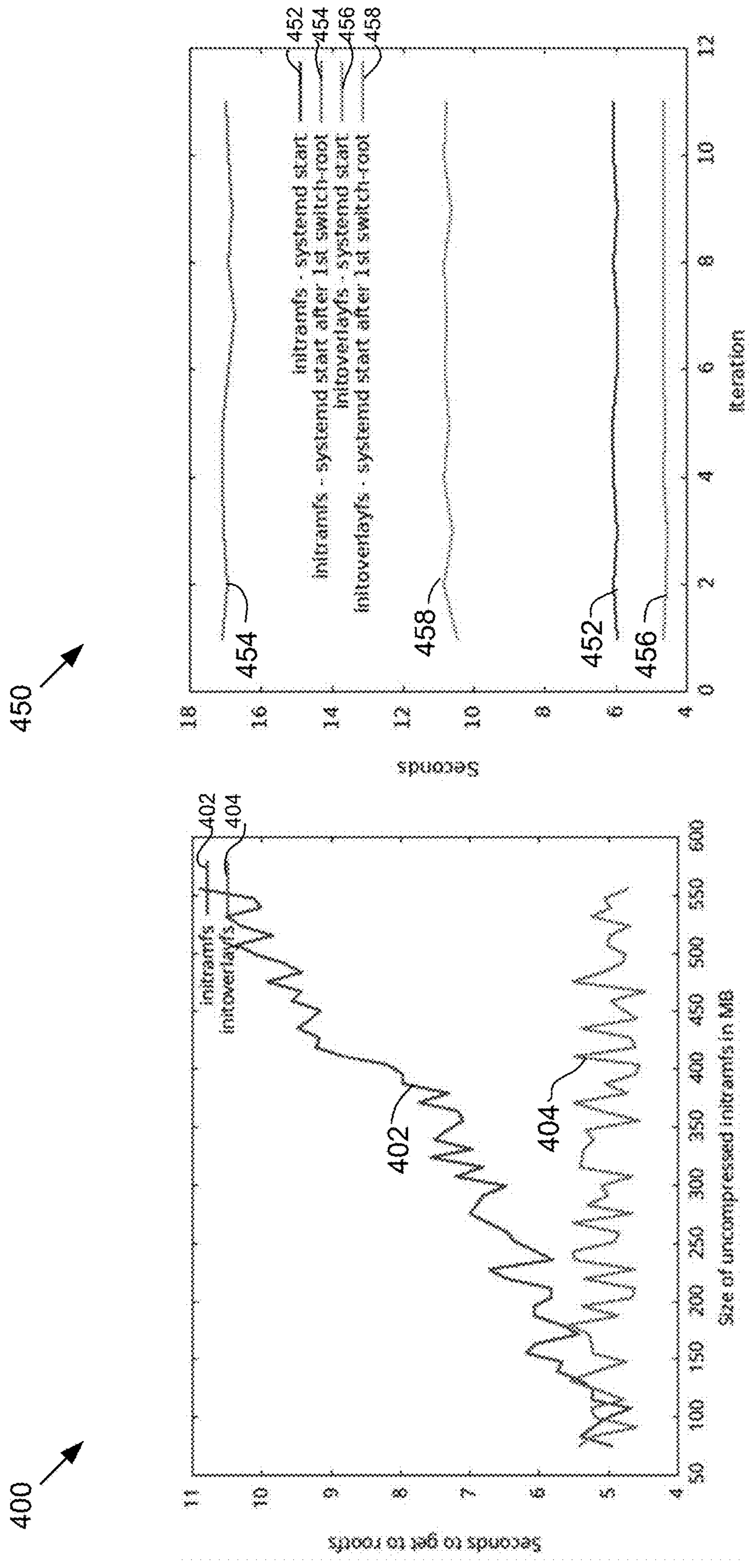
FIG. 4 illustrates example comparisons of boot-up times between the scalable filesystem of FIG. 3 and conventional filesystem, in accordance with embodiments of the disclosure.

FIG. 4 illustrates example comparisons of boot-up times between the scalable filesystem of FIG. 3 and conventional filesystem, in accordance with embodiments of the disclosure. The two graphs 400 and 450 shown in FIG. 4 compare the boot times and system performance between using an initramfs approach and the initoverlayfs approach (as shown in FIG. 2). The first graph 400 illustrates the impact of increasing the size of initramfs on boot time, showing how initoverlayfs mitigates this by scaling more efficiently. The second graph 450 compares the systemd start times on a Raspberry Pi 4 using both methods, highlighting the performance improvements when using initoverlayfs. An initramfs (Initial RAM File System) image is a fundamental component in preparing Linux systems during the boot process, preceding the initiation of the init process. Typically, generating an initramfs involves assembling all available kernel modules and necessary files to boot and support any hardware using the specific Linux kernel version XYZ. This may also include some initialization that's not hardware specific, such as disk encryption, disk verification, early graphics, early camera input, ostree prepare root, etc.

This conventional approach, however, presents a significant challenge: loading such a voluminous image into memory during boot is time-consuming and can be problematic in critical scenarios where time to boot is critical. Edge devices commonly need to boot as quickly as possible such as healthcare, automotive, and aviation. Conversely, the initoverlayfs approach described herein (as shown in FIG. 2 and described above) divides the initramfs image into two parts (e.g., corresponding to the stages 249 and 259 of FIG. 2), relying on transparent decompression rather than upfront decompression. This division entails segregating the initramfs image into two distinct components (e.g., the minified initial RAM disk 240 and the initial overlay filesystem 250). The first component (e.g., initramfs) contains init, kernel modules, udev-rules and an initoverlayfs tool, responsible for setting up and mounting initoverlayfs. The second component (e.g., initoverlayfs) contains all additional kernel modules and essential files required to support the Linux boot process.

As shown, FIG. 4 includes a first graph 400 showing the comparison of the boot-up times from start to the transition to the root filesystem (in seconds along the vertical axis), when the sizes of uncompressed initramfs varies (in megabytes along the horizontal axis). The overlay filesystem disclosed herein maintains the boot-up duration 404 under six seconds, regardless of the size of the uncompressed initramfs, while the conventional boot-up time 402 grows as the size of the uncompressed initramfs increases. The first graph 400 therefore compares the boot time effect of increasing initramfs size versus the effect of increasing initoverlayfs size, initoverlayfs is only effected by bytes to be used. As such, the introduced overlay filesystem may be scalable with the size of uncompressed initramfs while maintaining the desired range of boot-up time (e.g., 4-6 seconds, actual time range may vary based on hardware resources).

The first graph 400 demonstrates how the overlay filesystem herein may be useful in use cases where quick boot times are essential (such as automotive computer systems, in which a range of about 5 seconds for boot-up time is desired). As described above in FIGS. 2-3, unlike the conventional initramfs, which loads everything upfront, initoverlayfs divides the boot process into two stages. The initial stage (e.g., 249 of FIG. 2) loads a minimal filesystem, while the second stage (e.g., 259 of FIG. 2) loads additional components as needed, utilizing on-demand decompression. This approach significantly reduces the size of the initial filesystem, resulting in faster boot times, which is critical in environments like healthcare, automotive, and aviation.

This scalable approach moves a significant portion on the initial filesystem content to initoverlayfs which is more scalable as it does on-demand decompression. For illustration, consider a comparison of the sizes using dracut versus initoverlayfs: The advantages of adopting the initoverlayfs approach are evident in the substantial reduction in the size of the initramfs image, thereby significantly expediting the boot process, making it especially appealing in resource-constrained and time-sensitive scenarios.

The second graph 450 compares the systemd start time using initramfs only vs using initramfs+initoverlayfs on Raspberry Pi 4 with NVMe drive over USB. As shown, the horizontal axis shows the number of iterations and the vertical axis shows time in seconds. Four sets of data are shown, for comparing the systemd start time 452 with initramfs and the systemd start time 456 with initoverlayfs (both of which include upfront decompression); and for comparing the systemd start time 454 after the first switch-root with initramfs and the systemd start time 458 after the first switch-root with initoverlayfs (only the latter with on-demand decompression). As shown, the start times in either stage are shorter for the overlay filesystem disclosed herein than for the conventional initramfs.

Figure 5:
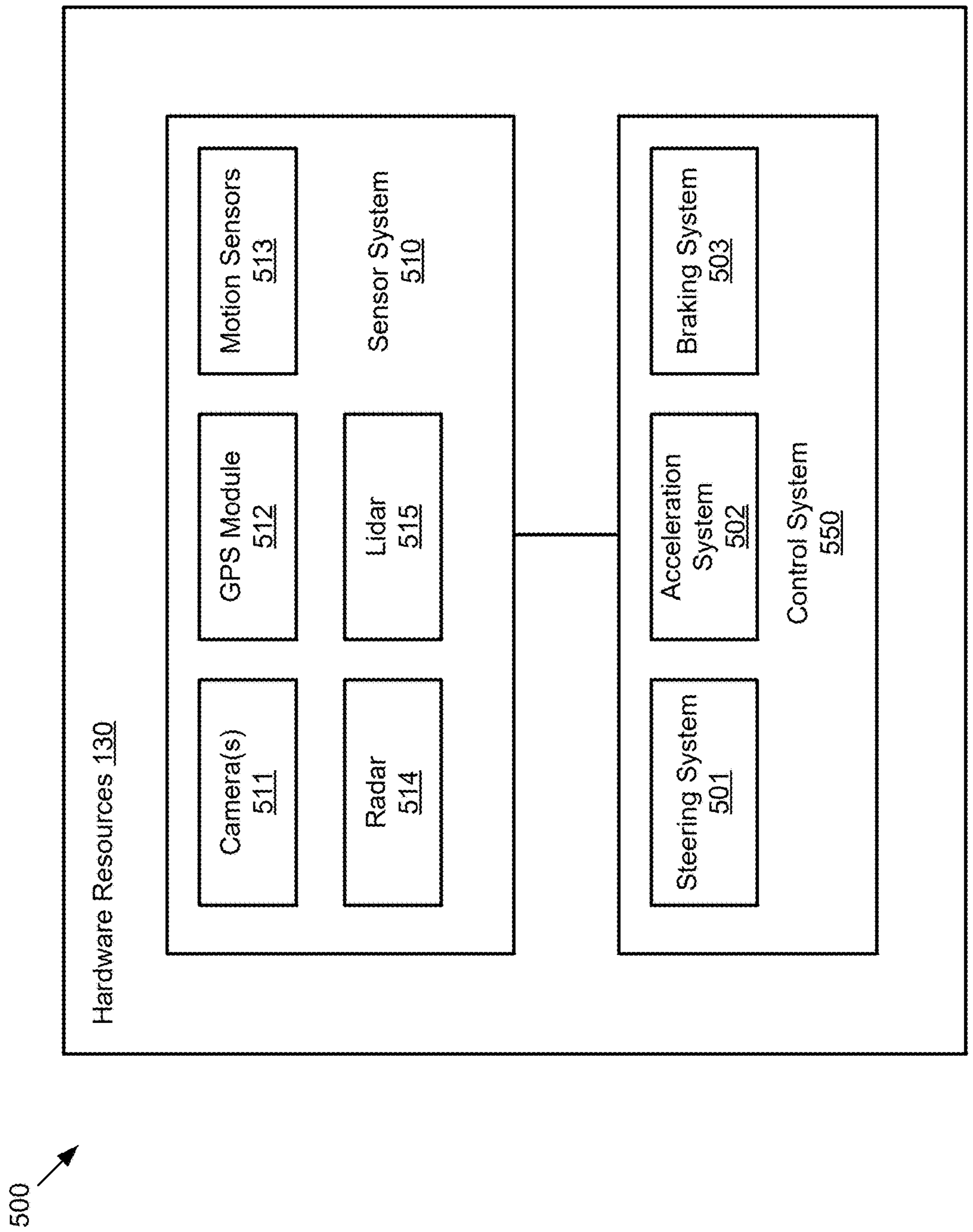
FIG. 5 illustrates an example diagram of a set of hardware resources, in accordance with embodiments of the disclosure.

FIG. 5 illustrates an example diagram 500 of a set of hardware resources, in accordance with embodiments of the disclosure. As shown, in addition to the hardware resources 130 shown in FIG. 1, the hardware resources 130 may further include a sensor system 510 and a control system 550, such as for an automotive computer use case. Using the overlay filesystem, the boot-up time for the automotive computer system, even with an increasing number of hardware components, is maintained at a desired range (as shown in FIG. 4).

As shown in FIG. 5, the sensor system 510 includes, but it is not limited to, one or more cameras 511, global positioning system (GPS) unit or module 512, motion sensors 513 (e.g., an inertial measurement unit (IMU), an accelerometer, etc.), radar unit 514, and a light detection and range (LIDAR) unit 515. The GPS module 512 may include a transceiver operable to provide information regarding the position of the ADV. The motion sensors 513 may sense position and orientation changes of the ADV based on inertial acceleration. Radar unit 514 may represent a system that utilizes radio signals to sense objects within the local environment of the ADV. In some embodiments, in addition to sensing objects, radar unit 514 may additionally sense the speed and/or heading of the objects. LIDAR unit 515 may sense objects in the environment in which the ADV is located using lasers. LIDAR unit 515 could include one or more laser sources, a laser scanner, and one or more detectors, among other system components. Cameras 511 may include one or more devices to capture images of the environment surrounding the ADV. Cameras 511 may be still cameras and/or video cameras. A camera may be mechanically movable, for example, by mounting the camera on a rotating and/or tilting a platform.

Sensor system 510 may further include other sensors (not shown), such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of a vehicle, or a combination thereof. A throttle sensor and a braking sensor sense the throttle position and braking position of a vehicle, respectively. In some situations, a throttle sensor and a braking sensor may be integrated as an integrated throttle/braking sensor.

The control system 550 of the hardware resources 130 may include a steering system 501, an acceleration system 502, and a braking system 503 (also referred to as the braking system 503). The steering system 501 is to adjust the direction or heading of a vehicle.

The acceleration system 502 is to control the speed of the motor or engine that in turn controls the speed and acceleration of a vehicle. The steering system 501 and the acceleration system 502 may be coupled. The braking system 503 is to decelerate a vehicle by providing friction to slow the wheels or tires of a vehicle. The braking system 503 may include a brake control module (not shown). The sensor system 510 and the control system 550 of FIG. 5 may be implemented in hardware (such as an integrated circuit (IC), or application-specific integrated circuits (ASICs)), software, or a combination thereof.

Figure 6:
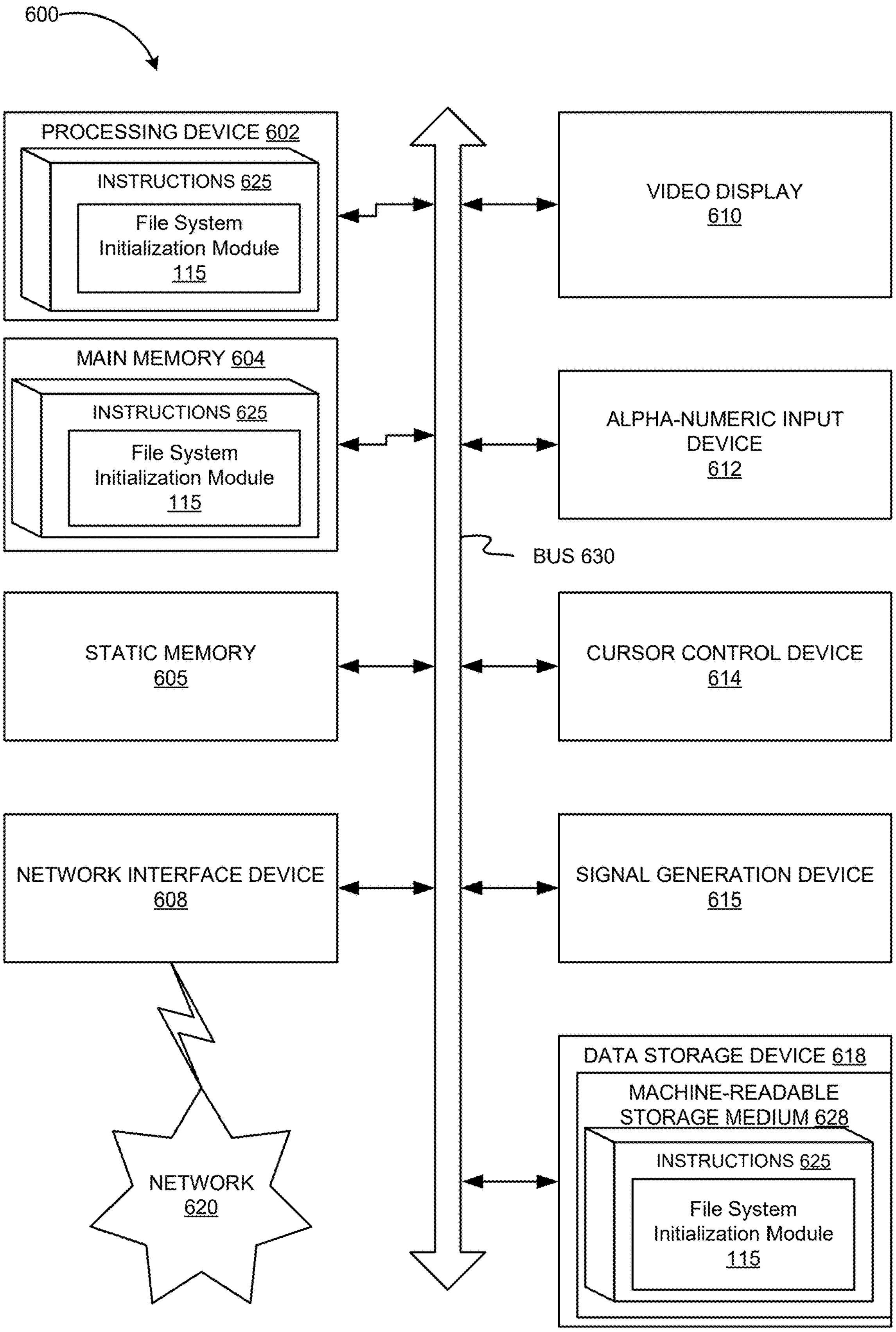
FIG. 6 is a block diagram of an example apparatus that may perform one or more of the operations described herein, in accordance with embodiments of the disclosure.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 605 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 615 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a repository search module, e.g., the file system initialization module 115, for carrying out the operations described herein (e.g., as presented in relation to FIGS. 2 and 3), in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of starting up an operating system, the method comprising:

loading, from a non-transitory and non-volatile memory, a bootloader into a random access memory (RAM);

loading, by the bootloader, a kernel into the RAM;

initializing, by the kernel, an initial filesystem to load storage drivers relevant to hardware resources of the operating system for starting essential storage components;

when the initial filesystem is initialized, mounting, by a processing device, an overlay filesystem onto the initial filesystem of the RAM;

transitioning, upon completion of system initialization tasks in the overlay filesystem, from the overlay filesystem to a target root filesystem; and unmounting the overlay filesystem.

2. The method of claim 1, wherein initializing the initial filesystem comprises:

performing an up-front decompression for minimal storage only initialization; and initializing, by a device manager of the hardware resources, storage components of the hardware resources based on the up-front decompression, wherein the initializing the storage components comprises loading storage drivers to enable access to the overlay filesystem.

3. The method of claim 2, wherein the initial filesystem comprises a read-only filesystem and wherein the overlay filesystem comprises a loopback-mounted enhanced read-only file system (EROFS) with a transient overlay that is readable and writable.

4. The method of claim 3, wherein mounting the overlay filesystem comprises:

executing, in the EROFS, on-demand decompression of files for the starting up of the operating system.

5. The method of claim 1, wherein transitioning from the overlay filesystem to the target root filesystem comprises:

mounting the target root filesystem located on a different partition or disk than the overlay filesystem.

6. The method of claim 1, further comprising:

initiating a basic input/output system (BIOS) or loading a unified extensible firmware interface (UEFI) before loading the bootloader.

7. The method of claim 1, wherein the bootloader comprises a Grand Unified Bootloader (GRUB).

8. A system comprising:

a memory; and a processing device coupled to the memory, the processing device to:

load, from a non-transitory and non-volatile memory, a bootloader into a random access memory (RAM);

load, by the bootloader, a kernel into the RAM;

initialize, by the kernel, an initial filesystem to load storage drivers relevant to hardware resources for starting essential storage components;

when the initial filesystem is initialized, mount an overlay filesystem onto the initial filesystem of the RAM;

transition, upon completion of system initialization tasks in the overlay filesystem, from the overlay filesystem to a target root filesystem; and unmount the overlay filesystem.

9. The system of claim 8, wherein to initialize the initial filesystem, the processing device is to:

perform an up-front decompression for minimal storage only initialization; and initialize, by a device manager of the hardware resources, storage components of the hardware resources based on the up-front decompression, wherein the initializing the storage components comprises loading storage drivers to enable access to the overlay filesystem.

10. The system of claim 9, wherein the initial filesystem comprises a read-only filesystem and wherein the overlay filesystem comprises a loopback-mounted enhanced read-only file system (EROFS) with a transient overlay that is readable and writable.

11. The system of claim 10, wherein to mount the overlay filesystem, the processing device is to:

execute, in the EROFS, on-demand decompression of files for the starting up of an operating system.

12. The system of claim 8, wherein to transition from the overlay filesystem to the target root filesystem, the processing device is to:

mount the target root filesystem located on a different partition or disk than the overlay filesystem.

13. The system of claim 8, wherein the processing device is further to:

initiate a basic input/output system (BIOS) or loading a unified extensible firmware interface (UEFI) before loading the bootloader.

14. The system of claim 8, wherein the bootloader comprises a Grand Unified Bootloader (GRUB).

15. A non-transitory computer-readable storage medium having instructions stored thereon that, when executed by a processing device, cause the processing device to:

load, from a non-transitory and non-volatile memory, a bootloader into a random access memory (RAM);

load, by the bootloader, a kernel into the RAM;

initialize, by the kernel, an initial filesystem to load storage drivers relevant to hardware resources for starting essential storage components;

when the initial filesystem is initialized, mount an overlay filesystem onto the initial filesystem of the RAM;

transition, upon completion of system initialization tasks in the overlay filesystem, from the overlay filesystem to a target root filesystem;

unmount the overlay filesystem.

16. The non-transitory computer-readable storage medium of claim 15, wherein to initialize the initial filesystem, the instructions cause the processing device to:

perform an up-front decompression for minimal storage only initialization; and initialize, by a device manager of the hardware resources, storage components of the hardware resources based on the up-front decompression, wherein the initializing the storage components comprises loading storage drivers to enable access to the overlay filesystem.

17. The non-transitory computer-readable storage medium of claim 16, wherein the initial filesystem comprises a read-only filesystem and wherein the overlay filesystem comprises a loopback-mounted enhanced read-only file system (EROFS) with a transient overlay that is readable and writable.

18. The non-transitory computer-readable storage medium of claim 17, wherein to mount the overlay filesystem, the instructions cause the processing device to:

execute, in the EROFS, on-demand decompression of files for the starting up of the operating system.

19. The non-transitory computer-readable storage medium of claim 15, wherein to transition from the overlay filesystem to the target root filesystem, the instructions cause the processing device to:

mount the target root filesystem located on a different partition or disk than the overlay filesystem.

20. The non-transitory computer-readable storage medium of claim 15, wherein the instructions cause the processing device to:

initiate a basic input/output system (BIOS) or loading a unified extensible firmware interface (UEFI) before loading the bootloader.

* * * * *